(12) United States Patent
Weikel et al.

(10) Patent No.: US 8,785,517 B2
(45) Date of Patent: Jul. 22, 2014

(54) PRESSURE-SENSITIVE ADHESIVES WITH ONIUM-EPDXY CROSSLINKING SYSTEM

(75) Inventors: Arlin L. Weikel, Roberts, WI (US); Larry R. Krepski, White Bear Lake, MN (US); Jason D. Clapper, Lino Lakes, MN (US); Wayne S. Mahoney, St. Paul, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 398 days.

(21) Appl. No.: 13/155,935

(22) Filed: Jun. 8, 2011

(65) Prior Publication Data
US 2012/0301715 A1 Nov. 29, 2012

Related U.S. Application Data

(60) Provisional application No. 61/489,745, filed on May 25, 2011.

(51) Int. Cl.
| | |
|---|---|
| C08G 59/14 | (2006.01) |
| C08G 59/00 | (2006.01) |
| C08G 59/18 | (2006.01) |
| C08G 59/20 | (2006.01) |
| B32B 7/12 | (2006.01) |
| B32B 15/08 | (2006.01) |
| B32B 15/082 | (2006.01) |
| B32B 15/09 | (2006.01) |
| B32B 15/092 | (2006.01) |
| B32B 37/12 | (2006.01) |

(52) U.S. Cl.
USPC ............ 522/100; 522/31; 522/67; 522/103; 522/113; 522/114; 522/120; 522/121; 522/153; 522/154; 522/150; 522/178; 522/180; 522/181; 522/182; 428/355 R; 428/355 EP; 428/355 AC; 427/208.4; 156/272.2; 156/275.7; 156/275.5

(58) Field of Classification Search
USPC ............ 522/31, 67, 100, 103, 113, 114, 120, 522/121, 153, 154, 150, 178, 180, 181, 522/182; 428/355 EP, 355 AC, 355 R; 427/208.4; 156/272.2, 275.5, 275.7
See application file for complete search history.

(56) References Cited

U.S. PATENT DOCUMENTS

| | | | |
|---|---|---|---|
| 3,691,140 A | 9/1972 | Silver | |
| 3,708,296 A | 1/1973 | Schlessinger | |
| 4,069,055 A | 1/1978 | Crivello | |
| 4,166,152 A | 8/1979 | Baker et al. | |
| 4,216,288 A | 8/1980 | Crivello | |
| 4,250,311 A | 2/1981 | Crivello | |
| 4,619,979 A | 10/1986 | Kotnour et al. | |
| 4,636,432 A | 1/1987 | Shibano et al. | |
| 4,656,218 A | 4/1987 | Kinoshita | |
| 4,751,138 A | 6/1988 | Tumey et al. | |
| 4,843,134 A | 6/1989 | Kotnour et al. | |
| 4,985,340 A | 1/1991 | Palazzotto et al. | |
| 5,045,569 A | 9/1991 | Delgado | |
| 5,084,586 A | 1/1992 | Farooq | |
| 5,124,417 A | 6/1992 | Farooq | |
| 5,506,279 A | 4/1996 | Babu et al. | |
| 5,554,664 A | 9/1996 | Lamanna et al. | |
| 5,637,646 A | 6/1997 | Ellis | |
| 5,804,610 A | 9/1998 | Hamer et al. | |
| 5,902,836 A | 5/1999 | Bennett et al. | |
| 6,790,310 B2 * | 9/2004 | Nakasuga et al. | 156/275.5 |

FOREIGN PATENT DOCUMENTS

| | | |
|---|---|---|
| EP | 0 887 706 | 12/1998 |
| WO | WO 81/00309 | 2/1981 |
| WO | WO 94/29358 | 12/1994 |
| WO | WO 2007/087399 | 8/2007 |
| WO | WO 2011/063070 | 5/2011 |

OTHER PUBLICATIONS

Koleske, Joseph V. (2002). Radiation Curing of Coatings. p. 61. ASTM International. [Retrieved Online Oct. 20, 2013] retrieved from <URL:http://app.knovel.com/hotlink/toc/id:kpRCCMNL01/radiation-curing-coatings>.*

Czech et al., "UV-crosslinked acrylic pressure-sensitive adhesive systems containing unsaturated ethers," vol. 52, No. 6, pp. 438-442, 2007.

Yarbrough, et al., "Contact Angle Analysis, Surface Dynamics, and Biofouling Characteristics of Cross-Linkable, Random Perfluoropolyether-Based Graft Terpolymers," Macromolecules, vol. 39, pp. 2521-2528, 2006.

Crivello, et al., "The Effects of Polyols as Chain Transfer Agents and Flexibilizers in Photoinitiated Cationic Photopolymerization", Journal of Radiation Curing, pp. 3-9, Oct. 1986.

PCT International Search Report, PCT/US2012/037729, mailed Aug. 17, 2012.

* cited by examiner

Primary Examiner — Sanza McClendon
(74) Attorney, Agent, or Firm — Kent S. Kokko

(57) ABSTRACT

A pre-adhesive composition is described comprising an acid- and epoxy-functional (meth)acryloyl copolymer, which when crosslinked using an ionic photoacid generator (PAG) provides a pressure-sensitive adhesive and pressure-sensitive adhesive articles having desirable properties.

26 Claims, No Drawings

PRESSURE-SENSITIVE ADHESIVES WITH ONIUM-EPDXY CROSSLINKING SYSTEM

CROSS REFERENCE TO RELATED APPLICATION

This application claims the benefit of U.S. Provisional Patent Application No. 61/489,745, filed May 25, 2011, the disclosure of which is incorporated by reference herein in its entirety.

BACKGROUND

Pressure-sensitive tapes are virtually ubiquitous in the home and workplace. In one of its simplest configuration, a pressure-sensitive tape includes an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted by A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures (e.g., 70° C.) for 10,000 minutes. Increased shear holding capability has generally been accomplished by crosslinking the PSA, although considerable care must be exercised so that high levels of tack and adhesion are retained in order to preserve the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen. A particular issue for the electronics industry and other applications in which PSAs contact a metal surface is the generation of corrosive or toxic by-products and the generation of undesirable color.

SUMMARY

Briefly, the present disclosure provides a crosslinkable (i.e., pre-adhesive) composition comprising an epoxy-functional copolymer, which when crosslinked with an ionic photoacid generator (PAG) provides a pressure-sensitive adhesive composition with fewer of the drawbacks discussed above. Of particular note, a composition of the present disclosure is more acceptable for use in the electronics industry and other applications in which PSAs contact a metal surface because of the smaller amount of photoacid generator required, which results in a smaller amount generated acid, thereby reducing the potential for the PSA to discolor and/or corrosion of sensitive substrates.

In one embodiment, the present disclosure provides a crosslinkable composition including: an epoxy-functional (meth)acrylic copolymer of interpolymerized monomers that include: an epoxy-functional (meth)acryloyl monomer; an optional acid-functional ethylenically unsaturated monomer; and an optional multifunctional (meth)acrylate crosslinker; and an ionic photoacid generator (PAG); wherein the epoxy-functional (meth)acryloyl monomer is used in an amount of no greater than 20 parts by weight, and the an ionic photoacid generator (PAG) is used in an amount of no greater than 0.5 part by weight, relative to 100 parts by weight of the total monomer.

In another embodiment, there is provided a crosslinkable composition including: an epoxy-functional (meth)acrylic copolymer of interpolymerized monomers that include: a (meth)acrylic acid ester of a non-tertiary alcohol; an optional acid-functional ethylenically unsaturated monomer; an epoxy-functional (meth)acryloyl monomer; an optional non-acid-functional polar monomer; an optional vinyl monomer; and an optional multifunctional (meth)acrylate crosslinker; and an ionic photoacid generator (PAG); wherein the epoxy-functional (meth)acryloyl monomer is used in an amount of 1 to 20 parts by weight, an ionic photoacid generator (PAG) is used in an amount of 0.01 to 1 part by weight, relative to 100 parts by weight of the total monomer content.

In yet another embodiment, there is provided a crosslinkable syrup composition including: a solute polymer that includes a plurality of interpolymerized monomers having pendant epoxy units; a component including at least one free-radically polymerizable solvent monomer; and an ionic photoacid generator (PAG); wherein the epoxy-functional monomer (i.e., monomer with pendant epoxy units) is used in an amount of no greater than 20 parts by weight, and the an ionic photoacid generator (PAG) is used in an amount of no greater than 1 part by weight, relative to 100 parts by weight of the total monomer content that would form an unmodified acid-functional (meth)acrylic copolymer.

In certain embodiments, an epoxy-functional (meth)acrylic copolymer includes (in addition to an epoxy-functional (meth)acryloyl monomer) interpolymerized monomers that include: 85 to 99 parts by weight of a (meth)acrylic acid ester of a non-tertiary alcohol; 1 to 20 parts by weight of an epoxy-functional (meth)acryloyl monomer; optionally 1 to 15 parts by weight of an acid-functional ethylenically unsaturated monomer; 0 to 10 parts by weight of a non-acidfunctional polar monomer; 0 to 5 parts by weight of a vinyl monomer; based on 100 parts by weight of the total monomer in the polymer. The (meth)acrylic acid ester of a non-tertiary alcohol, acid-functional ethylenically unsaturated monomer, non-acid-functional polar monomer, and certain vinyl monomer are examples of monomers that could be used to form the copolymer.

The present disclosure also provides pressure-sensitive adhesives prepared from the crosslinkable compositions (e.g., syrup compositions) described herein, as well as pressure-sensitive adhesive articles that include, for example, a coating of such adhesive. The pressure-sensitive adhesives, the crosslinked compositions, of this disclosure provide the desired balance of tack, peel adhesion, and shear holding power, and further conform to the Dahlquist criteria, i.e., the modulus of the adhesive at the application temperature, typically room temperature, is less than $3 \times 10^6$ dynes/cm at a frequency of 1 Hz.

In this application "pre-adhesive" refers to the mixture comprising an epoxy-functional copolymer and a crosslinking agent that may be crosslinked to form a pressure-sensitive adhesive.

"Syrup composition" refers to a solution of a solute polymer in one or more solvent monomers, the composition having a viscosity of from 500 to 10,000 cPs at 22° C.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "hydrocarbyl" means a saturated or unsaturated linear, branched, cyclic, or polycyclic hydrocarbon group. Unless otherwise indicated, the hydrocarbyl groups typically contain up to 30 carbon atoms, often up to 20 carbon atoms, and even more often up to 10 carbon atoms. This term is used to encompass alkyl, alkenyl, alkynyl groups, as well as cyclic groups such as alicyclic and aromatic groups, for example.

The term "heterohydrocarbyl" means a saturated or unsaturated linear, branched, cyclic, or polycyclic hydrocarbon group (unless otherwise indicated, typically containing up to 30 carbon atoms) having at least one catenary carbon atom replaced by a catenary heteroatom such as O, S, or N or containing functional groups such as amide, ester, urea, urethane or ether functional groups.

The term "(hetero)hydrocarbyl" includes both hydrocarbyl and heterohydrocarbyl.

The term "alicyclic group" means a cyclic hydrocarbon group having properties resembling those of aliphatic groups. The term "aromatic group" or "aryl group" means a mono- or polynuclear aromatic hydrocarbon group.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

Herein, "alkoxy" refers to an —O-alkyl group.

When a group is present more than once in a formula described herein, each group is "independently" selected, whether specifically stated or not. For example, when more than one R group is present in a formula, each R group is independently selected.

The terms "includes" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably.

All numbers are herein assumed to be modified by the term "about" and preferably with the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. The recitation of numerical ranges by endpoints includes all numbers subsumed within that range (e.g., 1 to 5 includes 1, 1.5, 2, 2.75, 3, 3.80, 4, and 5). All parts recited herein, including those in the Example section below, are by weight unless otherwise indicated.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

The present disclosure provides a pre-adhesive composition comprising an epoxy-functional (meth)acryloyl copolymer, which when crosslinked using an ionic photoacid generator (PAG) provides a pressure-sensitive adhesive and pressure-sensitive adhesive articles having desirable properties. Preferably the copolymer is both acid and epoxy-functional.

Chlorinated triazine crosslinking agents are highly efficient and reliable UV crosslinkers and often used to prepare high performance PSAs. They are oxygen tolerant, have scavenging ability, and are able to cure (meth)acrylic compositions under low intensity light irradiation. However, the presence of chlorinated reagents can be undesirable in the electronics industry as well as in other applications such as medical tapes. Thus, eliminating a chlorinated triazine crosslinking agent is desirable in certain situations.

The present disclosure describes a new way to obtain high performance PSAs using a very low level of a PAG with an acid- and epoxy-functional copolymer (e.g., isooctyl acrylate/acrylic acid/glycidyl methacrylate (IOA/AA/GMA) copolymer). Without being bound by theory, it is believed that the incipient acid of the PAG activates the epoxy ring in one polymer chain in-situ toward an epoxy group and/or an acid group in another polymer chain to produce a crosslinked polymer.

On irradiation with light energy, ionic photoacid generators undergo a fragmentation reaction and release one or more molecules of Lewis or Brönsted acid which catalyze the ring opening and addition of the pendent epoxy groups to form a crosslink. Useful photoacid generators are thermally stable and do not undergo thermally induced reactions with the copolymer, and are readily dissolved or dispersed in the crosslinkable compostion. Preferred photoacid generators are those in which the incipient acid has a pKa value of ≤0. Photoacid generators are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, 4.sup.th Edition, Supplement Volume, John Wiley and Sons, New York, year, pp 253-255.

Cations useful as the cationic portion of the ionic photoinitiators of the invention include organic onium cations, for example those described in U.S. Pat. Nos. 4,250,311, 3,708,296, 4,069,055, 4,216,288, 5,084,586, 5,124,417, 5,554,664 and such descriptions incorporated herein by reference, including aliphatic or aromatic Group WA VITA (CAS version) centered onium salts, preferably I-, S-, P-, Se- N- and C-centered onium salts, such as those selected from, sulfoxonium, iodonium, sulfonium, selenonium, pyridinium, carbonium and phosphonium, and most preferably I-, and S-centered onium salts, such as those selected from sulfoxonium, diaryliodonium, triarylsulfonium, diarylalkylsulfonium, dialkylarylsulfonium, and trialkylsulfonium wherein "aryl" and "alkyl" means an unsubstituted or substituted aromatic or aliphatic moiety, respectively, having up to four independently selected substituents. The substituents on the aryl or alkyl moieties will preferably have less than 30 carbon atoms and up to 10 heteroatoms selected from N, S, non-peroxidic O, P, As, Si, Sn, B, Ge, Te, Se. Examples include hydrocarbyl groups such as methyl, ethyl, butyl, dodecyl, tetracosanyl, benzyl, allyl, benzylidene, ethenyl and ethynyl; hydrocarbyloxy groups such as methoxy, butoxy and phenoxy; hydrocarbylmercapto groups such as methylmercapto and phenylmercapto; hydrocarbyloxycarbonyl groups such as methoxycarbonyl and phenoxycarbonyl; hydrocarbylcarbonyl groups such as formyl, acetyl and benzoyl; hydrocarbylcarbonyloxy groups such as acetoxy and cyclohexanecarbonyloxy; hydrocarbylcarbonamido groups such as acetamido and benzamido; azo; boryl; halo groups such as chloro, bromo, iodo and fluoro; hydroxy; oxo; diphenylarsino; diphenylstilbino; trimethylgermano; trimethylsiloxy; and aromatic groups such as cyclopentadienyl, phenyl, tolyl, naphthyl, and indenyl. With the sulfonium salts, it is possible for the substituent to be further substituted with a dialkyl- or diarylsulfonium cation; an example of this would be 1,4-phenylene bis(diphenylsulfonium).

The nature of the counteranion in an ionic PAG can influence the rate and extent of cationic addition polymerization of the epoxy groups. For example, J. V. Crivello, and R. Narayan, *Chem. Mater.*, 4, 692, (1992), report that the order of reactivity among commonly used normucleophilic anions is $SbF_6^- > AsF_6^- > PF_6^- > BF_4^-$. The influence of the anion on reactivity has been ascribed to three principle factors: (1) the acidity of the protonic or Lewis acid generated, (2) the degree of ion-pair separation in the propagating cationic chain and (3) the susceptibility of the anions to fluoride abstraction and consequent chain termination.

Useful onium salts include diazonium salts, such as aryl diazonium salts; halonium salts, such as diarlyiodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Useful ionic photoacid generators include bis(4-t-butylphenyl)iodonium hexafluoroantimonate (FP5034™ from Hampford Research Inc., Stratford, Conn.), a mixture of triarylsulfonium salts (diphenyl(4-phenylthio)phenylsulfonium hexafluoroantimonate, bis(4-(diphenylsulfonio)phenyl)sulfide hexafluoroantimonate) available as UVI-6976™ from Synasia Metuchen, N.J., (4-methoxyphenyl)phenyl iodonium triflate, bis(4-tert-butylphenyl)iodonium camphorsulfonate, bis(4-tert-butylphenyl)iodonium hexafluoroantimonate, bis(4-tert-butylphenyl)iodonium hexafluorophosphate, bis(4-tert-butylphenyl)iodonium tetraphenylborate, bis(4-tert-butylphenyl)iodonium tosylate, bis(4-tert-butylphenyl)iodonium triflate, ([4-(octyloxy)phenyl]phenyliodonium hexafluorophosphate), ([4-(octyloxy)phenyl]phenyliodonium hexafluoroantimonate), (4-isopropylphenyl)(4-methylphenyl)iodonium tetrakis(pentafluorophenyl)borate (available Rhodorsil 2074™ from Bluestar Silicones, East Brunswick, N.J.), bis(4-methylphenyl) iodonium hexafluorophosphate (available as Omnicat 440™ from IGM Resins Bartlett, Ill.), 4-(2-hydroxy-1-tetradecycloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio) phenylsulfonium hexafluorophosphate, bis(4-(diphenylsulfonio)phenyl)sulfide bis(hexafluorophosphate), Diphenyl(4-phenylthio)phenylsulfonium hexafluoroantimonate, bis(4-(diphenylsulfonio)phenyl)sulfide hexafluoroantimonate, and blends of these triarylsulfonium salts available from Synasia, Metuchen, N.J. under the trade designations of UVI-6992™ and UVI-6976™ for the $PF_6$ and $SbF_6$ salts, respectively.

The photoacid generator is used in amounts sufficient to effect the desired degree of crosslinking of the copolymer. The desired degree of crosslinking may vary, depending on the desired adhesive properties and the film thickness. The amount of the photoacid generator necessary to effect the desired degree of crosslinking will depend on the quantum yield of the photoacid generator (the number of molecules acid release per photon absorbed), the pKa of the acid, the permeability of the polymer matrix, the wavelength and duration of irradiation and the temperature. Generally the photoacid generator is used in amounts of 0.01 to 1 parts by weight, preferably 0.1 to 0.5 parts by weight relative to 100 parts by weight of total monomer/copolymer.

Optionally, it is within the scope of this invention to include photosensitizers or photoaccelerators with the photoacid generators. Use of photosensitizers or photoaccelerators alters the wavelength sensitivity of radiation-sensitive compositions employing the latent catalysts and photoacid generators of this invention. This is particularly advantageous when the photoacid generator does not strongly absorb the incident radiation. Use of photosensitizers or photoaccelerators increases the radiation sensitivity, allowing shorter exposure times and/or use of less powerful sources of radiation. Any photosensitizer or photoaccelerator may be useful if its triplet energy is at least 30 kilocalories per mole. Examples of such photosensitizers are given in Table 2-1 of the reference Steven L. Murov, Handbook of Photochemistry, Marcel Dekker Inc., N.Y., 27-35 (1973), and include those described in U.S. Pat. No. 4,985,340, and such description is incorporated herein by reference. When present, the amount of photosensitizer or photoaccelerator used in the practice of the present invention is generally less than 10 and preferably less than 1.0 wt % of photosensitizer or photoaccelerator based on the weight of the photoacid generator.

The (meth)acryloyl copolymer comprises epoxy-functional monomers. An exemplary epoxy-functional (meth)acryloyl monomer is of the formula:

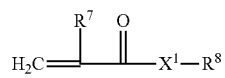

wherein:
$R^7$ is —H or $C_1$-$C_4$ alkyl;
$X^1$ is —$NR^9$— or —O—;
$R^8$ is an epoxy-substituted (hetero)hydrocarbyl group; and
$R^9$ is —H or a $C_1$-$C_4$ alkyl.

Preferably, the $R^8$ group is based on a straight-chain, branched, cyclic or polycyclic hydrocarbon of 2 to 30 carbons having an oxirane (epoxy) group included. More preferably, the $R^8$ group contains 3 to 10 carbons, such as glycidyl methacrylate (GMA). Some embodiments contain an epoxycyclohexyl group such as 3,4-epoxycyclohexylmethyl (meth)acrylate and 3-(2,3-epoxypropoxy)phenyl acrylate, 2-[4-(2,3-epoxypropoxy)phenyl]-2-(4-acryloyloxy-phenyl)propane, 4-(2,3-epoxypropoxy)cyclohexyl acrylate, 2,3-epoxycyclohexyl acrylate, and the acrylic acid monoester of poly(Bisphenol-A diglycidyl ether), commercially available as EBECRYL 3605, from Rad-Cure Corp., Fairfield, N.J., and species having $R^8$ according to the formula: —$[(CH_2)_5C(O)]_n$—$CH_2$-epoxycyclohexyl, wherein n is 0 to 10 and preferably 1-4. Epoxy-functional (meth)acrylate monomers useful in the disclosure include the acrylic acid monoester of poly(Bisphenol-A diglycidyl ether), commercially available as EBECRYL 3605, from Rad-Cure Corp., Fairfield, N.J., and the polyesters comprising (meth)acrylic acid, caprolactone or valerolactone or cyclooctanone lactone, and epoxidized cyclohexane derivatives such as 3,4-epoxycyclohexylmethanol, 3,4-epoxycyclohexane carboxylic acid, and 4,5-epoxycyclohexane-1,2-dicarboxylic acid.

In one useful embodiment, the epoxy functional monomer is derived from the reaction of vinyldimethyl azlactone with a hydroxyalkyl epoxy compound as shown in Scheme 1:

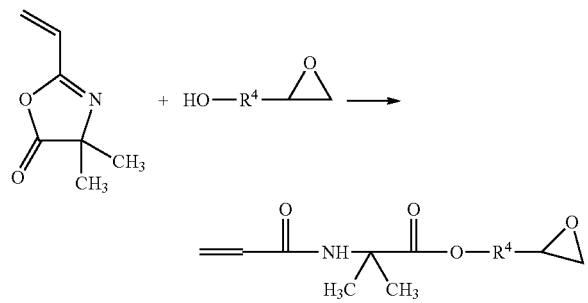

where $R^4$ is a $C_1$-$C_6$ alkylene.

Some preferred epoxy monomers are of the formula:

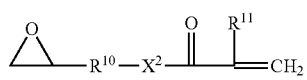

wherein:
$R^{10}$ is a (hetero)hydrocarbyl group, preferably a hydrocarbyl group;
$R^{11}$ is —H or $C_1$-$C_4$ alkyl;
$X^2$ is —$NR^{12}$— or —O—, and
$R^{12}$ is —H or a $C_1$-$C_4$ alkyl.

The epoxy-functional (meth)acryloyl monomer is used in an amount of no greater than 20 parts by weight, relative to 100 parts by weight of the total monomer content of an unmodified acid-functional (meth)acrylic copolymer. In certain embodiments, the epoxy-functional (meth)acryloyl monomer is used in an amount of at least 1 part, relative to 100 parts by weight of the total monomer content that would form an unmodified acid-functional (meth)acrylic copolymer. Preferably the epoxy-functional monomer is used in amounts of 1 to 10 parts by, relative to 100 parts by weight of the total monomer.

In addition to the epoxy-functional monomer, the copolymer comprises other monomers including for example, a (meth)acrylic acid ester of a non-tertiary alcohol (i.e., a (meth)acrylate ester monomer), an acid-functional ethylenically unsaturated monomer, a second, non-acid-functional polar monomer, and a vinyl monomer. Furthermore, a multifunctional (meth)acrylate can be used in the (meth)acrylic copolymer to assist in additional crosslinking and adhesive property enhancement.

A (meth)acrylate ester monomer useful in preparing the epoxy-functional (meth)acrylic copolymer is a monomeric (meth)acrylic acid ester of a non-tertiary alcohol, which alcohol contains from 1 to 14 carbon atoms and preferably an average of from 4 to 12 carbon atoms.

Examples of monomers suitable for use as the (meth)acrylate ester monomer include an esters of either acrylic acid or methacrylic acid with a non-tertiary alcohol such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable sources, such as 2-octanol, citronellol or dihydrocitronellol.

In some embodiments, it is desirable for the (meth)acrylic acid ester monomer component include a high Tg monomer, have a $T_g$ of at least 25° C., and preferably at least 50° C. As used herein, the term "$T_g$" of a monomer refers to the glass transition temperature of a homopolymer prepared from that monomer. Suitable high $T_g$ monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations thereof.

The (meth)acrylate ester monomer is typically used in an amount of 85 to 99 parts by weight, based on 100 parts by weight of the total monomer. Preferably, the (meth)acrylate ester monomer is used in an amount of 90 to 95 parts by weight of the 100 parts of the total monomer. When high $T_g$ monomers are included, the copolymer may include up to 30 parts by weight, preferably up to 20 parts by weight of the 85 to 99 parts by weight of (meth)acrylate ester monomer component.

The (meth)acrylic copolymer optionally, and preferably, further includes an acid-functional ethylenically unsaturated monomer, where the acid-functional group may be an acid per se, such as a carboxylic acid, or a portion may be salt thereof, such as an alkali metal carboxylate. Useful acid-functional ethylenically unsaturated monomers include, but are not limited to, those selected from an ethylenically unsaturated carboxylic acid, ethylenically unsaturated sulfonic acid, ethylenically unsaturated phosphonic acid, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid-functional ethylenically unsaturated monomers of the acid- and epoxy-functional (meth)acrylic copolymer are generally selected from ethylenically unsaturated carboxylic acids, i.e., (meth)acrylic acids. When an even stronger acid is desired, an acid-functional ethylenically unsaturated monomer includes an ethylenically unsaturated sulfonic acid, an ethylenically unsaturated phosphonic acid, or a mixture thereof.

When present, the acid-functional ethylenically unsaturated monomer is generally used in an amount of at least 1 part by weight, based on 100 parts by weight of the total monomer content that would form an unmodified acid-functional (meth)acrylic copolymer. The acid-functional ethylenically unsaturated monomer is generally used in an amount of no greater than 15 parts by weight, and often no greater than 10 parts by weight of the 100 parts of the total monomer content. In certain embodiments, 1 part to 15 parts by weight acid-functional ethylenically unsaturated monomer is used, based on 100 parts by weight of the total monomer content that would form an unmodified acid-functional (meth)acrylic copolymer.

In certain embodiments, a non-acid-functional polar monomer is used in making the epoxy-functional (meth)acrylic copolymer. As used herein, the term "polar monomer" is exclusive of an acid-functional ethylenically unsaturated monomer, and is referred to as a "non-acid-functional polar monomer."

Representative examples of a suitable non-acid-functional polar monomer includes, but is not limited to, 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates and mixtures thereof. Preferred polar monomers include those selected from the group consisting of 2-hydroxyethyl (meth)acrylate and N-vinylpyrrolidinone.

A non-acid-functional polar monomer may be used in an amount of 0 to 10 parts by weight, based on 100 parts by weight of the total monomer content. In certain embodiments, such monomer is used in an amount of at least 0.5 part by weight of the 100 parts of the total monomer content. In certain embodiments, such monomer is used in an amount of no greater than 5 parts by weight of the 100 parts of the total monomer content.

When used, vinyl monomers useful in the (meth)acrylic copolymer include a styrene, substituted styrene (e.g., α-methyl styrene), vinyl halide, and mixtures thereof. As used herein, the term "vinyl monomer" is exclusive of an acid-functional ethylenically unsaturated monomer, an acrylate ester monomer, and a polar monomer.

A vinyl monomer may be used in an amount of 0 to 5 parts by weight, based on 100 parts by weight of the total monomer content that would form an unmodified acid-functional (meth)acrylic copolymer. In certain embodiments, such monomer is used in an amount of at least 1 part by weight of the 100 parts of the total monomer content.

Preferably the copolymer contains no allyl ether, vinyl ether or vinyl ester monomer units.

In order to increase cohesive strength of the coated adhesive composition, a multifunctional (meth)acrylate monomer may be incorporated into the blend of polymerizable monomers to assist in crosslinking. Such compounds are often referred to as chemical crosslinking agents. A multifunctional (meth)acrylate is particularly useful for emulsion or syrup polymerization. Examples of useful multifunctional (meth) acrylates include, but are not limited to, di(meth)acrylates, tri(meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

If used, typically, a multifunctional (meth)acrylate is used in an amount of less than 5 parts by weight, relative to 100 parts by weight of the total monomer content that would form the epoxy-functional (meth)acrylic copolymer. In certain embodiments, a multifunctional (meth)acrylate crosslinker may be present in an amount of less than 1 part by weight. In certain embodiments, such chemical crosslinker is used in an amount of at least 0.01 part by weight. In certain embodiments, such chemical crosslinker is used in an amount of at least 0.05 part by weight. In some embodiments the crosslinking compositions contain no multifunctional (meth)acrylates.

An epoxy-functional (meth)acrylic copolymer can be prepared by a conventional free radical polymerization method, including solution, radiation, bulk, dispersion, emulsion, and suspension processes. For example, it may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al.); U.S. Pat. No. 4,656, 218 (Kinoshita); and U.S. Pat. No. 5,045,569 (Delgado). Each describes adhesive compositions, and the descriptions of polymerization processes.

One method of preparing epoxy-functional (meth)acrylic copolymers includes partially polymerizing monomers to produce a syrup composition comprising the solute epoxy-functional (meth)acrylic copolymer and unpolymerized solvent monomers. The syrup composition is polymerized to a useful coating viscosity, which may be coated onto a substrate (such as a tape backing) and further polymerized. Partial polymerization provides a coatable solution of the epoxy-functional (meth)acrylic solute polymer in one or more free-radically polymerizable solvent monomers. Generally, the PAG is added to the partially polymerized composition, then coated on a suitable substrate and further polymerized.

Thus, herein a crosslinkable composition can be described as including an epoxy-functional (meth)acrylic copolymer, optionally with unreacted monomers, and a PAG. Alternatively, the crosslinkable composition can be described as a crosslinkable syrup composition that includes a solute polymer comprising a plurality of polymerized monomer units comprising pendant epoxy (or oxirane) units, a component comprising at least one free-radically polymerizable solvent monomer (i.e., unreacted monomer), a PAG, and optionally a multifunctional (meth)acrylate chemical crosslinking agent.

The polymerizations may be conducted in the presence of, or preferably in the absence of, suitable solvents such as ethyl acetate, toluene and tetrahydrofuran, which are unreactive with the functional groups of the components of the syrup composition.

Polymerization can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 part by weight, preferably at least 0.001 part by weight, and more preferably at least 0.005 part by weight, relative to 100 parts by weight of the solvent monomer(s) of the unmodified epoxy-functional (meth)acrylic copolymer. Typically, a photoinitiator can be employed in a concentration of no more than 3.0 parts by weight, preferably no more than 1.0 part by weight, and more preferably no more than 0.5 part by weight, relative to 100 parts by weight of the total monomer content.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2-dimethoxy-2-phenylacetophenone photoinitiator, available the trade name IRGACURE 651 photoinitiator (BASF Corporation; Florham Park, N.J.), 2,2 dimethoxy-2-phenyl-1-phenylethanone, available under the trade name ESACURE KB-1 photoinitiator (Sartomer Co., West Chester, Pa.), and dimethylhydroxyacetophenone; substituted a-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup composition. Such polymerizable photoinitiators are described, for example, in U.S. Pat. Nos. 5,902,836 and 5,506,279 (B. N. Gaddam et al.).

The syrup composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably 15 to 450 mW/cm$^2$. Where actinic radiation is used to fully or partially polymerize the syrup composition, high intensities and short exposure times are preferred. For example, an intensity of 600 mW/cm$^2$ and an exposure time of about 1 second may be used successfully. Intensities can range from 0.1 to 150 mW/cm$^2$, preferably from 0.5 to 100 mW/cm$^2$, and more preferably from 0.5 to 50 mW/cm$^2$. Such photoinitiators preferably are present in an amount of from 0.1 to 1.0 part by weight, relative to 100 parts by weight of the total monomer content that would form an unmodified acid-functional (meth)acrylic copolymer.

Accordingly, relatively thick coatings (e.g., at least about 1 mil or 25.4 micrometers) can be achieved when the extinction coefficient of the photoinitiator is low.

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is at least 100,000, preferably at least 500,000.

When preparing epoxy-functional (meth)acrylic copolymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

In some embodiments, the epoxy-functional (meth)acrylic copolymers may be prepared by solution methods. A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of 40° C. to 100° C. until the reaction is completed, typically in 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In an alternate embodiment, a solventless polymerization method, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers. Copolymers prepared by such process may be combined with the PAG as well as optional additives such as tackifiers and plasticizer resins or compounds. Additional cohesive strength of the coated adhesive can be further enhanced by exposure to UV radiation to initiate crosslinking reactions.

The UV initiated crosslinking of the copolymers may be illustrated in the following Scheme 2. The ester, epoxy and optional acid monomer units are shown where the subscripts x, y and z correspond to the parts by weight of each monomer unit.

In Scheme 2, two acid- and epoxy functional copolymer 1a and 1b having (meth)acrylate monomer units, optional acid-functional monomer units and epoxy-functional monomer units are shown. Copolymers 1a and 1b have a number of polymerized monomer units x, y and z, corresponding to the parts by weight of each monomer unit as previously described. Not shown are the non-acid functional polar monomer units, the vinyl monomer units, or the multifunctional (meth)acrylate monomer units. On irradiation with light energy, ionic photoacid generators undergo a fragmentation reaction and release one or more molecules of Lewis or Brönsted acid which catalyze the ring opening and addition of the pendent epoxy groups to form the oxonium functional polymer 2. This activated epoxy 2 may be ring-opened by a pendent acid group of copolymer 1b to form intermediate 3, or may be ring-opened by the epoxy group of copolymer 1b to form intermediate 4. The intermediate 4 may continue to

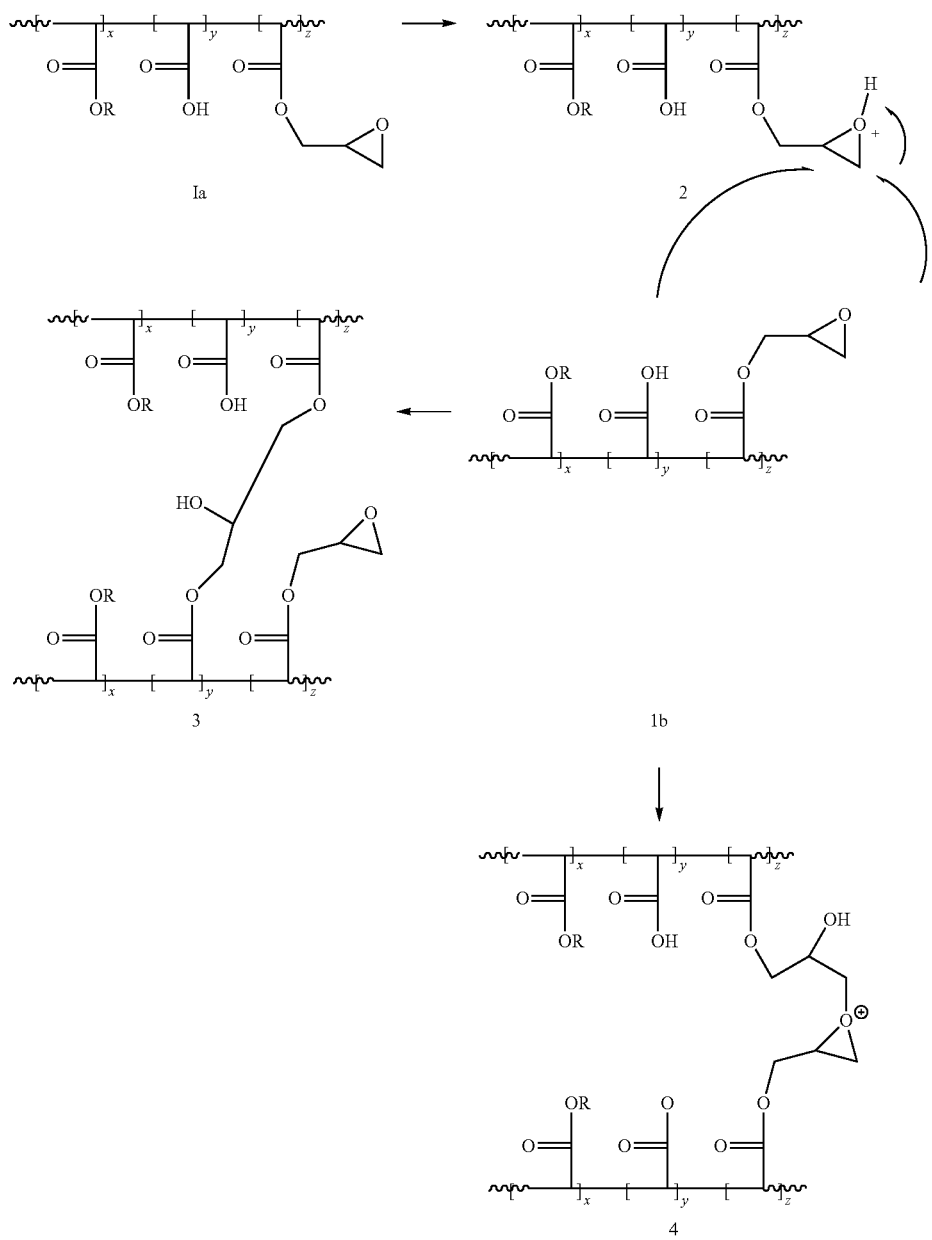

cationically polymerize adjacent epoxy groups. The hydroxyl group of intermediate 3 can further function as a chain transfer agent in the cationic polymerization of the epoxy groups, as described in J. V Crivello, D. A. Conlon, D. R. Olson "The Effects of Polyols as Chain Transfer Agents and Flexibilizers in Photoinitiated Cationic Photopolymerization", *Journal of Radiation Curing*, October 1986, 3-9.

It is preferable to coat the adhesive composition soon after preparation. The adhesive polymer composition (containing the copolymer, monomers, and crosslinking agent), either as a syrup or solution, are easily coated upon suitable substrates, such as flexible backing materials, by conventional coating techniques, then further polymerized, and cured, to produce adhesive coated sheet materials. The flexible backing material may be any material conventionally utilized as a tape backing, optical film, or any other flexible material.

A pressure-sensitive adhesive composition may also contain one or more conventional additives. Preferred additives include tackifiers, plasticizers, dyes, antioxidants, and UV stabilizers. Such additives can be used if they do not affect the superior properties of the pressure-sensitive adhesives.

If tackifiers are used, then up to 50% by weight, preferably less than 30% by weight, and more preferably less than 5% by weight, based on the dry weight of the total adhesive polymer would be suitable. In some embodiments no tackifier is used. Suitable tackifiers for use with (meth)acrylate polymer dispersions include a rosin acid, a rosin ester, a terpene phenolic resin, a hydrocarbon resin, and a cumarone indene resin. The type and amount of tackifier can affect properties such as contactability, bonding range, bond strength, heat resistance and specific adhesion.

Adhesive articles may be prepared by coating the adhesive or pre-adhesive composition of a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the disclosure include HOSTAPHAN 3SAB, primed polyester film (available from Mitsubishi Polyester Film Inc., Greer, S.C.), kraft paper (available from Monadnock Paper, Inc.); cellophane (available from Flexel Corp.); spun-bond poly(ethylene) and poly (propylene), such as TYVEK and TYPAR (available from DuPont, Inc.); and porous films obtained from poly(ethylene) and poly(propylene), such as TESLIN (available from PPG Industries, Inc.), and CELLGUARD (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The solutions may be of any desirable concentration, and degree of conversion, for subsequent coating, but is typically 20 to 70 weight percent (wt-%) polymer solids, and more typically 30 to 50 wt-% solids, in solvent. The emulsions also may be of any desirable concentration for subsequent coating, but is typically 30 to 70 wt-% polymer solids, and generally contains less than 2% unreacted monomer. The syrup composition may be of any desirable concentration for subsequent coating, but is typically 5 to 20 wt-% polymer solids in monomer. The desired concentration may be achieved by further dilution of the coating composition, or by partial drying.

The flexible support may also include a release-coated substrate. Such substrates are typically employed when an adhesive transfer tape is provided. Examples of release-coated substrates are well known in the art and include, by way of example, silicone-coated Kraft paper, and the like. Tapes of the disclosure may also incorporate a low adhesion backing (LAB), which are known in the art.

EXAMPLES

Objects and advantages of this disclosure are further illustrated by the following examples, but the particular materials and amounts thereof recited in these examples, as well as other conditions and details, should not be construed to unduly limit this disclosure.

As used herein, "pph" refers to parts per one hundred parts of the monomers that would be in an unmodified acid-functional (meth)acrylic copolymer, e.g., 100 parts of IOA and AA total.

Test Methods

Peel Adhesion Test [ASTM D 3330/D 3330M-04]

The test measures the force required to peel the tape from glass at an angle of 180 degrees. The test was performed on conditioned tapes prepared in the examples using the procedure described in the referenced ASTM Test Methods. The adhesive formulation to be tested was coated onto Mitsubishi Hostaphan™ primed polyester film. A test sample was prepared by adhering a 12.7-millimeter (12.7-mm) wide tape to a glass (for examples 1 to 93), stainless steel plate or high density polyethylene coupon (for examples 94 to 99) and rolling over the tape twice with 2-kilogram (2-kg) roller. Prior to peel and shear testing, tapes were conditioned for 24 hours in a controlled environment room (23° C./50% relative humidity. The tape was tested on a tensile force tester at a platen speed of 12 inches/minute (305 millimeter/minute (mm/min)) and, for some samples, also at 90 inches/min (2286 mm/min). Three samples were tested for each example and platen speed. The averaged values were expressed in Newtons per decimeter (N/dm).

Shear Strength Test [ASTM D-3654/D3654M 06]

The test measures the static shear strength of an adhesive tape in minutes at room temperature (RT) and at elevated temperature (70° C.) from when one end of the tape is adhered to a stainless steel plate, suspended vertically, and a weight is attached to the free end of the tape.

70° C. Shear:

A test sample was prepared from the conditioned tapes prepared in the examples. A 12.7-mm wide by 25.4-mm long tape was adhered to one edge of a stainless steel plate so that it overlapped the panel by 12.7 mm, and a 2-kg roller was rolled twice over the portion of tape adhered to the panel. A 0.5-kg weight was attached to the free end of the tape, and the panel was suspended vertically in an oven set at 70° C. The time, in minutes, for the tape to fall from the panel was measured and the time to failure and the mode of failure was recorded. The failure mode can be adhesive (a) in which the adhesive pulls away cleanly from the panel or the tape backing or cohesive (c) in which the adhesive splits and part of the adhesive is left on the tape and part is left on the tape backing. The test was terminated if failure had not occurred in 10,000 minutes and the results recorded. The data reported was as an arithmetic average of three measurements.

Room Temperature Shear:

A test sample was prepared and tested in the same manner as for 70° C. Shear except that a 1-kg weight was attached to the tape and the test panel was suspended in a controlled environment room (23° C./50% Relative Humidity).

TABLE 1

Raw materials used for these examples are described in the table below.

| Chemical Abbreviation | Chemical Name | Chemical Company |
|---|---|---|
| IOA | Isooctyl acrylate | 3M Co, Cordova, IL USA |
| AA | Acrylic acid | Alfa Aesar, Ward Hill, MA USA |
| GA | Glycidyl acrylate | Aldrich Chemical Co., Milwaukee, WI USA |
| GMA | Glycidyl methacrylate | Pfaltz & Bauer, Inc., Waterbury, CT USA |
| 4-HBAGE | 4-hydroxybutyl acrylate glycidylether | Nippon Kasei Chemical Co. Ltd., Tokyo, Japan |
| EVDM | oxiran-2-ylmethyl N-acryloyl-2-methylalaninate | Preparation described below |
| HDDA | 1,6 hexanediol diacrylate | Alfa Aesar, Lancaster, PA USA |
| Hampford | Bis(4-t-butylphenyl) iodonium hexafluoroantimonate | Hampford Research Inc., Stratford, CT USA |
| Rhodorsil 2074 | Iodonium, (4-(1-methylethyl)phenyl)(4-methylphenyl)-tetrakis | Bluestar Silicones, Rock Hill, SC USA |
| 3M SbF$_6$ salt | Bis(dodecylphenyl) iodonium hexafluoroantimonate | Described in U.S. Pat. No. 6,587,628 (Walker et al.) |
| Chivacure 548 | Triaryl sulfonium hexafluoroantimonate | Chitec technology Co. Ltd., Taipei City, Taiwan |
| UVI 6976 | mixed triarylsulfonium hexafluoroantimonate salts (50% in propylene carbonate) | Synasia Inc., Metuchen, NJ USA |
| Foral 85LB | Foral 85LB | Pinova Inc, Brunswick, GA USA |
| BA | Butyl acrylate | Aldrich Chemical Co., Milwaukee, WI USA |
| IBOA | Isobornyl acrylate | Aldrich Chemical Co., Milwaukee, WI USA |
| IRG-651 | 2-dimethoxy-2-phenylacetophenone photoinitiator | Ciba Specialty Chemicals, Tarrytown, NY |
| Staybelite 3E | | Eastman Co. |
| Escorez 2520 | | ExxonMobile Co |
| Foral 85E | | Eastman Chemical Co., |

Preparation of oxiran-2-ylmethyl N-acryloyl-2-methylalaninate (EVDM)

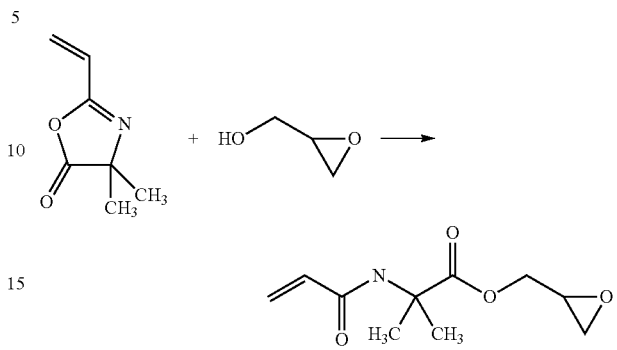

To a 4 ounce glass jar were added vinyldimethyl azlactone (17.1 g, 0.12 mol, available from 3M), freshly distilled glycidol (9.1 g, 0.12 mol, available from Acros) and 2 drops of 1,8-diazabicyclo[5.4.0]undec-7-ene (DBU, available from Aldrich). The mildly exothermic reaction was moderated by cooling the reaction vessel in an ice bath for a few minutes, then the reaction mixture was allowed to stand at room temperature overnight. The solid white reaction product was recrystallized from a mixture of diethyl ether and cyclohexane. The resulting crystals were filtered off, washed with 50 mL of cyclohexane, and dried to provide the desired product (20.4 g). NMR and IR spectral analyses confirmed the structure of the product.

Preparation of the Syrup Copolymer for Examples Containing Epoxy Acrylate Comonomer A one quart jar was charged with 70 g of isooctyl acrylate (IOA, 70 parts), 10 g of acrylic acid (AA, 10 parts), 20 g of 4-hydroxybutyl acrylate glycidylether, (4-HBAGE, 20 parts), and 0.04 g of Irgacure™ 651 (Irg651), 0.04 phr). The monomer mixture was purged with nitrogen for 5 minutes then exposed to low intensity ultraviolet radiation until a coatable syrup copolymer was prepared.

The pre-adhesive polymer syrup was blended with additional 0.16 g (0.16 phr) of the Irgacure™ 651 and with 0.4 g UVI 6976 (50 wt % in propylene carbonate) (0.2 phr). This is Example 1 in Table 2, below. The formulations were then coated on Mitsubishi Hostaphan™ primed polyester film at a 2 mil (~50 micrometers) thickness for the syrup pre-adhesive formulations and cured by UVA light (550 mJ/cm$^2$) or by a combination of UVA (550 mJ/cm$^2$) and UVC (200 mJ/cm$^2$).

All other samples were made in a very similar manner by using different epoxy acrylate monomers, varying monomer concentrations, and using different concentrations of iodonium and sulfonium salts as curing agents as shown in Tables 2-6.

Preparation of the Syrup for IOA/AA Control Samples

A one quart jar was charged with 450 g of isooctyl acrylate (IOA, 90 parts), 50 g of acrylic acid (AA, 10 parts), and 0.20 g of Irgacure™ 651, 0.04 phr. The monomer mixture was purged with nitrogen for 5 minutes then exposed to low intensity ultraviolet radiation until a coatable syrup copolymer was prepared, after which an additional 0.8 g (0.16 phr) of the Irgacure™ 651 and 0.4 g (0.08 phr) of HDDA was added as shown in Table 2-6 (see samples labeled Control). The formulations were then coated on Mitsubishi Hostaphan™ primed polyester film at a 2 mil (~50 micrometers) thickness for the syrup pre-adhesive formulations and cured by UVA light (550 mJ/cm$^2$).

Preparation of the Syrup for Epoxy Acrylate Comonomer Control Samples

A one quart jar was charged with 450 g of isooctyl acrylate (IOA, 90 parts), 47.5 g of acrylic acid (AA, 9.5 parts), 2.5 g of epoxy acrylate comonomer (0.5 parts), and 0.20 g of Irgacure™ 651, 0.04 phr. The monomer mixture was purged with nitrogen for 5 minutes then exposed to low intensity ultraviolet radiation until a coatable syrup copolymer was prepared, after which an additional 0.8 g (0.16 phr) of the Irgacure™ 651 was added. Some samples also included that addition of 0.4 g (0.08 phr) of HDDA as shown in Table 8. The formulations were then coated on Mitsubishi Hostaphan™ primed polyester film at a 2 mil (~50 micrometers) thickness for the syrup pre-adhesive formulations and cured by UVA light (550 mJ/cm$^2$).

Preparation of the Syrup for Onium Salt Control Samples

A one quart jar was charged with 450 g of isooctyl acrylate (IOA, 90 parts), 50 g of acrylic acid (AA, 10 parts), and 0.20 g of Irgacure™ 651, 0.04 phr. The monomer mixture was purged with nitrogen for 5 minutes then exposed to low intensity ultraviolet radiation until a coatable syrup copolymer was prepared, after which an additional 0.8 g (0.16 phr) of the Irgacure™ 651 and 2.0 g (0.2 phr) of onium salt was added as shown in Table 9. The formulations were then coated on Mitsubishi Hostaphan™ primed polyester film at a 2 mil (~50 micrometers) thickness for the syrup pre-adhesive formulations and cured by UVA light (550 mJ/cm$^2$).

Preparation of the Base Syrup Copolymer for Samples in Table 10 Containing Epoxy Acrylate Comonomer A one quart jar was charged with 89 g of isooctyl acrylate (IOA, 89 parts), 10 g of acrylic acid (AA, 10 parts), 1 g of 4-hydroxybutyl acrylate glycidylether, (4-HBAGE, 1 part), and 0.04 g of Irgacure™ 651 (Irg651, 0.04 phr). The monomer mixture was purged with nitrogen for 5 minutes then exposed to low intensity ultraviolet radiation until a coatable syrup copolymer was prepared.

The pre-adhesive polymer syrup was blended with additional 0.16 g (0.16 phr) of the Irgacure™ 651 and with 0.2 g bis(4-t-butylphenyl)iodonium hexafluoroantimonate (Hampford) (0.2 phr) as shown in Table 10.

Compounding of Adhesive Formulations:

A 25 dram vial was charged with 20 g (100 phr) of base syrup from Formulation A of Table 10, 1.0 g (10 phr) Foral 85LB, and 0.2 g (1 phr) 4-HBAGE to produce Example 1 of Table 11. All other samples were made in a similar manner by using different epoxy acrylate monomers, varying monomer concentrations, using various tackifier loadings and using different concentrations of iodonium salt as curing agents as shown in Tables 10-14. The formulation was then coated onto Mitsubishi Hostaphan™ primed polyester film at a 2 mil (~50 micrometers) thickness for the syrup pre-adhesive formulations and cured by UVA light (550 mJ/cm$^2$) or by irradiation first with UVA (550 mJ/cm$^2$) and then, in a subsequent step, irradiation with UVC (200 mJ/cm$^2$).

Preparation of the Syrup for IOA/AA Control Samples in Table 14 Containing Tackifier A one quart jar was charged with 450 g of isooctyl acrylate (IOA, 90 parts), 50 g of acrylic acid (AA, 10 parts), and 0.20 g of Irgacure™ 651, 0.04 phr. The monomer mixture was purged with nitrogen for 5 minutes then exposed to low intensity ultraviolet radiation until a coatable syrup copolymer was prepared, after which an additional 0.8 g (0.16 phr) of the Irgacure™ 651, 0.4 g (0.08 phr) of HDDA and optionally Foral 85LB tackifier were added as shown in Table 14. The formulations were then coated on Mitsubishi Hostaphan™ primed polyester film at a 2 mil (~50 micrometers) thickness for the syrup pre-adhesive formulations and cured by UVA light (550 mJ/cm$^2$).

Peel Adhesion and Shear Strength were measured for tapes prepared from these adhesives as described in the test methods above.

TABLE 2

Adhesive formulations containing various levels of 4-HBAGE using UVI 6976 sulfonium salt mixture as the curing agent and irradiated with UVA.

| Example | IOA (wt %) | AA (wt %) | 4-HBAGE (wt %) | UVI 6976 (phr) | HDDA (phr) | Shear (25° C.) | Shear (70° C.) | Peel @ 0.3 m/min (N/dm) | Peel @ 2.3 m/min (N/dm) |
|---|---|---|---|---|---|---|---|---|---|
| 1 | 70 | 10 | 20 | 0.2 | 0 | 10000 | 10000 | 0 | 0 |
| 2 | 75 | 10 | 15 | 0.2 | 0 | 10000 | 10000 | 0 | 0 |
| 3 | 80 | 10 | 10 | 0.2 | 0 | 10000 | 10000 | 0 | 0 |
| 4 | 85 | 10 | 5 | 0.2 | 0 | 10000 | 10000 | 1 | 3 |
| 5 | 87 | 10 | 3 | 0.2 | 0 | 10000 | 10000 | 9 | 27 |
| 6 | 89 | 10 | 1 | 0.2 | 0 | 10000 | 10000 | 36 | 65 |
| 7 | 89.5 | 10 | 0.5 | 0.2 | 0 | 10000 | 10000 | 45 | 72 |
| 8 | 89.9 | 10 | 0.1 | 0.2 | 0 | 10000 | 10000 | 49 | 72 |
| 9 | 89.95 | 10 | 0.05 | 0.2 | 0 | 10000 | 10000 | 46 | 72 |
| 10 (Control) | 90 | 10 | 0 | 0 | 0.08 | 9020$^c$ | 784$^c$ | 50 | 71 |

$^c$stands for cohesive mode of failure.

TABLE 3

Adhesive formulations containing various levels of 4-HBAGE using Hampford iodonium salt as the curing agent and irradiated with UVA.

| Example | IOA (wt %) | AA (wt %) | 4-HBAGE (wt %) | Hampford (phr) | HDDA (phr) | Shear (25° C.) | Shear (70° C.) | Peel @ 0.3 m/min (N/dm) | Peel @ 2.3 m/min (N/dm) |
|---|---|---|---|---|---|---|---|---|---|
| 11 | 70 | 10 | 20 | 0.2 | 0 | 10000 | 10000 | 3 | 16 |
| 12 | 75 | 10 | 15 | 0.2 | 0 | 10000 | 10000 | 4 | 22 |
| 13 | 80 | 10 | 10 | 0.2 | 0 | 10000 | 10000 | 17 | 40 |
| 14 | 85 | 10 | 5 | 0.2 | 0 | 10000 | 10000 | 24 | 52 |
| 15 | 87 | 10 | 3 | 0.2 | 0 | 10000 | 10000 | 52 | 77 |

TABLE 3-continued

Adhesive formulations containing various levels of 4-HBAGE using Hampford iodonium salt as the curing agent and irradiated with UVA.

| Example | IOA (wt %) | AA (wt %) | 4-HBAGE (wt %) | Hampford (phr) | HDDA (phr) | Shear (25° C.) | Shear (70° C.) | Peel @ 0.3 m/min (N/dm) | Peel @ 2.3 m/min (N/dm) |
|---|---|---|---|---|---|---|---|---|---|
| 16 | 89 | 10 | 1 | 0.2 | 0 | 10000 | 10000 | 61 | 82 |
| 17 | 89.5 | 10 | 0.5 | 0.2 | 0 | 10000 | 10000 | 69 | 85 |
| 18 | 89.9 | 10 | 0.1 | 0.2 | 0 | 6801$^c$ | 1422$^c$ | 63 | 81 |
| 19 | 89.95 | 10 | 0.05 | 0.2 | 0 | 1398$^c$ | 87$^c$ | 62 | 77 |
| 20 (Control) | 90 | 10 | 0 | | 0.08 | 8427$^c$ | 1352$^c$ | 57 | 77 |

$^c$stands for cohesive mode of failure.

TABLE 4

Adhesive formulations containing various levels of GMA using UVI 6976 sulfonium salt mixture as the curing agent and irradiated with UVA.

| Example | IOA (wt %) | AA (wt %) | GMA (wt %) | UVI 6976 (wt %) | HDDA (wt %) | Shear (25° C.) | Shear (70° C.) | Peel @ 0.3 m/min (N/dm) | Peel @ 2.3 m/min (N/dm) |
|---|---|---|---|---|---|---|---|---|---|
| 21 | 70 | 10 | 20 | 0.2 | 0 | G | G | G | G |
| 22 | 75 | 10 | 15 | 0.2 | 0 | 10000 | 10000 | 0 | 0 |
| 23 | 80 | 10 | 10 | 0.2 | 0 | 10000 | 10000 | 1 | 1 |
| 24 | 85 | 10 | 5 | 0.2 | 0 | 10000 | 10000 | 26 | 8 |
| 25 | 87 | 10 | 3 | 0.2 | 0 | 10000 | 10000 | 38 | 47 |
| 26 | 89 | 10 | 1 | 0.2 | 0 | 10000 | 10000 | 50 | 73 |
| 27 | 89.5 | 10 | 0.5 | 0.2 | 0 | 10000 | 10000 | 50 | 75 |
| 28 | 89.9 | 10 | 0.1 | 0.2 | 0 | 2005c | 364c | 51 | 74 |
| 29 | 89.95 | 10 | 0.05 | 0.2 | 0 | 378c | 43c | 48 | 70 |
| 30 (Control) | 90 | 10 | 0 | 0 | 0.08 | 10000 | 5824c | 43 | 70 | cstands for cohesive mode of failure.
G means formulation gelled before processing.

TABLE 5

Adhesive formulations containing various levels of GMA using Hampford iodonium salt as the curing agent and irradiated with UVA.

| Example | IOA (wt %) | AA (wt %) | GMA (wt %) | Hampford (wt %) | HDDA (wt %) | Shear (25° C.) | Shear (70° C.) | Peel @ 0.3 m/min (N/dm) | Peel @ 2.3 m/min (N/dm) |
|---|---|---|---|---|---|---|---|---|---|
| 31 | 70 | 10 | 20 | 0.2 | 0 | G | G | G | G |
| 32 | 75 | 10 | 15 | 0.2 | 0 | G | G | G | G |
| 33 | 80 | 10 | 10 | 0.2 | 0 | 10000 | 10000 | 35 | 8 |
| 34 | 85 | 10 | 5 | 0.2 | 0 | 10000 | 10000 | 46 | 23 |
| 35 | 87 | 10 | 3 | 0.2 | 0 | 10000 | 10000 | 48 | 49 |
| 36 | 89 | 10 | 1 | 0.2 | 0 | 10000 | 10000 | 52 | 81 |
| 37 | 89.5 | 10 | 0.5 | 0.2 | 0 | 10000 | 10000 | 58 | 80 |
| 38 | 89.9 | 10 | 0.1 | 0.2 | 0 | 444 | 17c | 51 | 73 |
| 39 | 89.95 | 10 | 0.05 | 0.2 | 0 | 432 | 20c | 49 | 73 |
| 40 (Control) | 90 | 10 | 0 | | 0.08 | 10000 | 996c | 44 | 72 | cstands for cohesive mode of failure.
G means formulation gelled before processing.

TABLE 6

Adhesive formulations containing GMA and various levels of UVI 6976 sulfonium salt mixture as the curing agent and irradiated with UVA or first with UVA then subsequently with UVC

| Example | IOA (wt %) | AA (wt %) | GMA (wt %) | UVI 6976 (phr) | UV Cure | Shear (25° C.) | Shear (70° C.) | Peel @ 0.3 m/min (N/dm) | Peel @ 2.3 m/min (N/dm) |
|---|---|---|---|---|---|---|---|---|---|
| 41 | 89.5 | 10 | 0.5 | 0.2 | UVA | 10000 | 10000 | 55 | 82 |
| 42 | 89.5 | 10 | 0.5 | 0.2 | UVA/UVC | 10000 | 10000 | 51 | 80 |
| 43 | 89.5 | 10 | 0.5 | 0.1 | UVA | 10000 | 10000 | 52 | 76 |

TABLE 6-continued

Adhesive formulations containing GMA and various levels of UVI 6976 sulfonium salt mixture as the curing agent and irradiated with UVA or first with UVA then subsequently with UVC

| Example | IOA (wt %) | AA (wt %) | GMA (wt %) | UVI 6976 (phr) | UV Cure | Shear (25° C.) | Shear (70° C.) | Peel @ 0.3 m/min (N/dm) | Peel @ 2.3 m/min (N/dm) |
|---|---|---|---|---|---|---|---|---|---|
| 44 | 89.5 | 10 | 0.5 | 0.1 | UVA/UVC | 10000 | 10000 | 48 | 76 |
| 45 | 89.5 | 10 | 0.5 | 0.05 | UVA | 10000 | 10000 | 50 | 73 |
| 46 | 89.5 | 10 | 0.5 | 0.05 | UVA/UVC | 10000 | 10000 | 48 | 75 |
| 47 (Control) | 90 | 10 | 0 | 0 | UVA/UVC | 10000 | 1582c | 50 | 66 | cstands for cohesive mode of failure.
G means formulation gelled before processing.

TABLE 7

Adhesive formulations containing GMA and various levels of Hampford iodonium salt as the curing agent and irradiated with UVA or first with UVA and then with UVC.

| Example | IOA (wt %) | AA (wt %) | GMA (wt %) | Hampford (phr) | UV Cure | Shear (25° C.) | Shear (70° C.) | Peel @ 0.3 m/min (N/dm) | Peel @ 2.3 m/min (N/dm) |
|---|---|---|---|---|---|---|---|---|---|
| 48 | 89.5 | 10 | 0.5 | 0.2 | UVA | 10000 | 10000 | 75 | 97 |
| 49 | 89.5 | 10 | 0.5 | 0.2 | UVA/UVC | 10000 | 10000 | 64 | 84 |
| 50 | 89.5 | 10 | 0.5 | 0.1 | UVA | 3526c | 10000 | 75 | 89 |
| 51 | 89.5 | 10 | 0.5 | 0.1 | UVA/UVC | 10000 | 10000 | 70 | 89 |
| 52 | 89.5 | 10 | 0.5 | 0.05 | UVA | 1107c | 3429c | 70 | 90 |
| 53 | 89.5 | 10 | 0.5 | 0.05 | UVA/UVC | 10000 | 10000 | 58 | 85 |
| 54 (Control) | 90 | 10 | 0 | 0 | UVA | 8777c | 1018c | 61 | 83 | cstands for cohesive mode of failure.
G means formulation gelled before processing.

TABLE 8

Control adhesive formulations containing different epoxy acrylate monomers and irradiated with UVA.

| Example | IOA (wt %) | AA (wt %) | GA (wt %) | GMA (wt %) | EVDM (wt %) | 4-HBAGE (wt %) | HDDA (phr) | Shear (25° C.) | Shear (70° C.) | Peel @ 0.3 m/min (N/dm) | Peel @ 2.3 m/min (N/dm) |
|---|---|---|---|---|---|---|---|---|---|---|---|
| 55 | 90 | 9.5 | 0.5 | 0 | 0 | 0 | 0 | 10000 | 10000 | 38 | 52 |
| 56 | 90 | 9.5 | 0.5 | 0 | 0 | 0 | 0.08 | 10000 | 10000 | 35 | 47 |
| 57 | 90 | 9.5 | 0 | 0.5 | 0 | 0 | 0 | 200c | 14c | 40 | 50 |
| 58 | 90 | 9.5 | 0 | 0.5 | 0 | 0 | 0.08 | 10000 | 10000 | 39 | 49 |
| 59 | 90 | 9.5 | 0 | 0 | 0.5 | 0 | 0 | 759c | 40c | 40 | 51 |
| 60 | 90 | 9.5 | 0 | 0 | 0.5 | 0 | 0.08 | 10000 | 10000 | 38 | 51 |
| 61 | 90 | 9.5 | 0 | 0 | 0 | 0.5 | 0 | 385c | 17c | 40 | 52 |
| 62 | 90 | 9.5 | 0 | 0 | 0 | 0.5 | 0.08 | 10000 | 10000 | 38 | 51 |
| 63 (Control) | 90 | 10 | 0 | 0 | 0 | 0 | 0.08 | 9048c | 821c | 40 | 51 | cstands for cohesive mode of failure.

TABLE 9

Control formulations containing various onium salts but no epoxy monomers irradiated with UVA.

| Example | IOA (wt %) | AA (wt %) | Onium (wt %) | Onium Salt | Shear (25° C.) | Shear (70° C.) | Peel @ 0.3 m/min (N/dm) | Peel @ 2.3 m/min (N/dm) |
|---|---|---|---|---|---|---|---|---|
| 64 | 90 | 10 | 0.2 | 3M SbF6 salt | 334 | 11 | 26 | 38 |
| 65 | 90 | 10 | 0.2 | Hampford | 365 | 10 | 29 | 38 |
| 66 | 90 | 10 | 0.2 | Rhodorsil 2074 | 332 | 13 | 35 | 46 |
| 67 | 90 | 10 | 0.2 | Chivacure 548 | 366 | 20 | 61 | 76 |
| 68 | 90 | 10 | 0.2 | UVI 6976 | 403 | 39 | 55 | 76 |

TABLE 10

Compositions of formulations of base syrup containing bis(4-t-butylphenyl) iodonium hexafluoroantimonate (Hampford) and 4-hydroxybutyl acrylate glycidylether (4-HBAGE).

| Formulation | IOA (wt %) | AA (wt %) | 4-HBAGE (wt %) | Hampford (phr) |
|---|---|---|---|---|
| A | 89 | 10 | 1 | 0.2 |
| B | 89 | 10 | 1 | 0.2 |
| C | 89 | 10 | 1 | 0.2 |

TABLE 11

Adhesive formulations of the base syrups of Table 10 containing the tackifier Foral 85LB and various levels of 4-HBAGE and irradiated with UVA.

| Example | Formulation A (phr) | Formulation B (phr) | Formulation C (phr) | Foral 85LB (phr) | 4-HBAGE (phr) | Shear (70° C.) | Peel @ 0.3 m/min (N/dm) |
|---|---|---|---|---|---|---|---|
| 69 | 100 |  |  | 10 | 1 | 10000 | 33 |
| 70 | 100 |  |  | 10 | 3 | 10000 | 24 |
| 71 | 100 |  |  | 10 | 5 | 10000 | 20 |
| 72 | 100 |  |  | 10 | 10 | 10000 | 13 |
| 73 | 100 |  |  | 10 | 15 | 10000 | 8 |
| 74 | 100 |  |  | 10 | 20 | 10000 | 7 |
| 75 |  | 100 |  | 10 | 0 | 10000 | 53 |
| 76 |  | 100 |  | 10 | 1 | 10000 | 41 |
| 77 |  | 100 |  | 10 | 3 | 10000 | 37 |
| 78 |  | 100 |  | 10 | 5 | 10000 | 32 |
| 79 |  |  | 100 | 10 | 0 | 26$^c$ | 49 |
| 80 |  |  | 100 | 10 | 1 | 10000 | 44 |

$^c$stands for cohesive mode of failure.

TABLE 12

Adhesive formulations of the base syrup of Formulation B of Table 10 containing the various levels of the tackifier Foral 85LB and 5 phr of 4-HBAGE and irradiated with UVA.

| Example | Formulation B (phr) base syrup | Foral 85LB (phr) | Shear (70° C.) | Peel @ 0.3 m/min (N/dm) |
|---|---|---|---|---|
| 81 | 100 | 15 | 10000 | 35 |
| 82 | 100 | 20 | 10000 | 32 |
| 83 | 100 | 25 | 10000 | 34 |
| 84 | 100 | 30 | 10000 | 44 |

TABLE 13

Adhesive formulations of base syrups containing 4-HBAGE, the Hampford iodonium salt, and 10 phr of the tackifier Foral 85LB irradiated first with UVA and subsequently with UVC.

| Example | Formulation C (phr) | Foral 85LB (phr) | Hampford (phr) | UVC (mJ) | Shear (70° C.) | Peel @ 0.3 m/min (N/dm) |
|---|---|---|---|---|---|---|
| 85 | 100 | 0 | 0.05 | 0 | 10000 | 52 |
| 86 | 100 | 10 | 0.05 | 200 | 10000 | 45 |
| 87 | 100 | 0 | 0.01 | 0 | 10000 | 63 |
| 88 | 100 | 10 | 0.01 | 200 | 6 | 55 |

TABLE 14

Control formulations containing HDDA and optionally Foral 85LB tackifier but not containing epoxy monomers or onium salts.

| Example | IOA (wt %) | AA (wt %) | Foral 85LB (phr) | HDDA (phr) | Shear (70° C.) | Peel @ 0.3 m/min (N/dm) |
|---|---|---|---|---|---|---|
| 89 | 90 | 10 | 0 | 0.16 | 1175$^c$ | 55 |
| 90 | 90 | 10 | 10 | 0.16 | 3$^c$ | 36 |
| 91 | 90 | 10 | 0 | 0.16 | 3377$^c$ | 69 |

TABLE 14-continued

Control formulations containing HDDA and optionally Foral 85LB tackifier but not containing epoxy monomers or onium salts.

| Example | IOA (wt %) | AA (wt %) | Foral 85LB (phr) | HDDA (phr) | Shear (70° C.) | Peel @ 0.3 m/min (N/dm) |
|---|---|---|---|---|---|---|
| 92 | 90 | 10 | 10 | 0.16 | 10$^c$ | 53 |
| 93 | 90 | 10 | 0 | 0.16 | 307$^c$ | 55 |

$^c$stands for cohesive mode of failure.

Preparatory Examples 94-99

Adhesive copolymers with epoxy pendant groups were prepared from the copolymerization of isooctyl acrylate (IOA), butyl acrylate (BA), isobornyl acrylate (IBOA), and glycidyl methacrylate (GMA) using the general procedures of U.S. Pat. No. 5,804,610 (Hamer et al.). 2-dimethoxy-2-phenylacetophenone photoinitiator (commercially available under the trade designation IRGACURE 651 from Ciba Specialty Chemicals (Tarrytown, N.Y.)) was added to initiate the polymerization of the elastomer formulations. Copolymer formulations were mixed as detailed in Table 15 in an amber jar. A portion (28 grams) of each formulation was poured into and heat-sealed within a clear poly ethylene vinyl acetate (pEVA) pouch such as to eliminate any air bubbles. Pouches are made by heat sealing 0.065 mm thick EVA film (VA-24, Flint Hills Resources of Wichita, Kans.). The approximate weight per pouch was 1.4 g. Each sealed pouch with monomer was immersed in a constant temperature water bath at 17° C. and irradiated with ultraviolet light (365 nm, 4 mW/cm$^2$) for eight minutes on each side to polymerize the monomer compositions. The products were polymerized elastomeric materials within the PVA pouch.

TABLE 15

Preparation of Adhesive Pouch Materials

| Adhesive Material Pouch | IOA (grams/wt %) | BA (grams/wt %) | IBOA (grams/wt %) | GMA (grams/wt %) | IRG-651 (grams) |
|---|---|---|---|---|---|
| P1 | 14/50 | 12.6/45 | 0/0 | 1.4/5 | 0.028 |
| P2 | 12.6/45 | 11.2/40 | 2.8/10 | 1.4/5 | 0.028 |
| P3 | 23.8/85 | 0/0 | 2.8/10 | 1.4/5 | 0.028 |
| P4 | 24.6/88 | 0/0 | 2.8/10 | 0.56/2 | 0.028 |

Preparation of Examples and Comparative Examples

Pouches of copolymers were blended with the sulfonium salt photoacid generator (UVI-6976, Synasia Co.) as well as various tackifying resins as shown in Table 16. The pouches of copolymers were mixed for 5 minutes at 100 revolutions per minute (rpm) while at 145° C. using a high temperature compounder commercially available under the trade designation BRABENDER (Half Size Mixer) from C. W. Brabender (Hackensack, N.J.). UVI 6976 containing the sulfonium salt and optionally tackifying resins were added to the elastomeric melt in the high temperature compounder and allowed to mix for an additional 10 minutes. The mixing chamber was then cooled to 100° C. and the rotation of the mixing paddles was reversed to expel and collect resulting adhesive material.

Once cooled, approximately 1 gram of the compounded material was placed between a primed PET liner (3SAB, obtained from Mitsubishi (Greer, S.C.)) and a silicone treated release liner (Silphan S36, from Siliconature SPA (Godega di Sant'Urbano, Italy)). This construction was placed between the plates of a heated press from Carver, Inc. (Wabash, Ind.) with plate temperatures set at 80° C. The construction was then compressed until the compounded material was approximately 0.2 millimeters (mm) in thickness. Samples were then passed under a Fusion UV lamp (Fusion UV Systems INC. Gaithersburg, Md.) using a quartz UV H bulb delivering a total irradiation energy of 600 mJ/cm$^2$ and then conditioned at 70° C. for one week. After aging, test samples were then cut from each construction and the silicone release layer was peeled off immediately before shear and peel adhesion tests.

Hot-Melt Processed Examples

TABLE 16

Hot-Melt Processed Formulations and Resulting Adhesive Performance

| | Melt Processed Formulations | | | | | Adhesive Performance | | |
|---|---|---|---|---|---|---|---|---|
| | | | | | | 70 C. Shear | Peel Force (N/dm) | |
| Example | Adhesive Material Pouch/g | UVI 6976 g | Foral 85E g | Escorez 2520 g | Staybelite 3E g | Strength S. Steel min | S. Steel N/dm | HDPE N/dm |
| 94 | P1/(20.7) | 0.27 | 6.44 | 0.84 | | +10,000 | 19 | 9 |
| 95 | P1/(14.6) | 0.27 | 12.04 | | 1.4 | +10,000 | 51 | 37 |
| 96 | P2/(20.7) | 0.27 | 6.44 | 0.84 | | +10,000 | 56 | 36 |
| 97 | P2/(20.7) | 0.068 | 6.44 | 0.84 | | +10,000 | 47 | 35 |
| 98 | P3/(20.7) | 0.09 | 6.44 | 0.84 | | 5,430 | 52 | 40 |
| 99 | P4/(20.7) | 0.09 | 6.44 | 0.84 | | 1,130 | 79 | 45 |

The invention claimed is:

1. A crosslinkable composition comprising:
   a) an epoxy-functional (meth)acrylic copolymer comprising interpolymerized monomers comprising:
      i) an alkyl (meth)acrylate monomer;
      ii) an epoxy-functional (meth)acryloyl monomer;
      iii) an acid-functional ethylenically unsaturated monomer in amounts of 1 to 15 parts by weight of the 100 parts of the total monomer;
      iv) an optional non-acid functional polar monomer;
      v) an optional vinyl monomer, and
      vi) an optional multifunctional (meth)acrylate crosslinker; and
   b) an ionic photoacid generator.

2. The crosslinkable composition of claim 1 wherein the epoxy-functional (meth)acryloyl monomer is used in an amount of no greater than 20 parts by weight, and the ionic photoacid generator is used in an amount of no greater than 1 part by weight, relative to 100 parts by weight of the total monomer.

3. The crosslinkable composition of claim 1 wherein the ionic photoacid generator is used in an amount of 0.01 to 1 part by weight.

4. The crosslinkable composition of claim 1 wherein the epoxy-functional (meth)acryloyl monomer is used in an amount of 1 to 20 parts by weight.

5. The crosslinkable composition of claim 1 wherein the epoxy-functional (meth)acrylic copolymer comprises interpolymerized monomers comprising:
   i) 85 to 99 parts by weight of a (meth)acrylic acid ester of a non-tertiary alcohol;
   ii) 1 to 20 parts by weight of an epoxy-functional (meth)acryloyl monomer; and
   iii) 1 to 15 parts by weight of an acid-functional ethylenically unsaturated monomer;

based on 100 parts of the total monomer content.

6. The crosslinkable composition of claim 1 wherein the epoxy-functional (meth)acryloyl monomer is used in an amount of 1 to 10 parts by weight based on 100 parts total monomer.

7. The crosslinkable composition of claim 1 wherein the (meth)acrylic copolymer further comprises interpolymerized monomers comprising a non-acid-functional polar monomer and a vinyl monomer.

8. The crosslinkable composition of claim 1 further comprising a multifunctional (meth)acrylate monomer.

9. The crosslinkable composition of claim 1 wherein the ionic photoacid generator is selected from iodonium salts;

sulfonium salts, sulfoxonium salts, selenonium salts, sulfoxonium salts, phosphonium salts, and arsonium salts.

10. The crosslinkable composition of claim 9 wherein the salts are selected from $SbF_6^-$, $AsF_6^-$, $PF_6^-$, and $BF_4^-$ salts.

11. The crosslinkable composition of claim 1 wherein the epoxy-functional (meth)acryloyl monomer is of the formula:

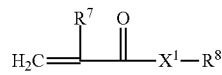

wherein:
$R^7$ is —H or $C_1$-$C_4$ alkyl;
$X^1$ is —O— or —$NR^9$—;
$R^8$ is an epoxy-substituted hydrocarbyl group; and
$R^9$ is —H or a $C_1$-$C_4$ alkyl.

12. The crosslinkable composition of claim 11 wherein $R^8$ is

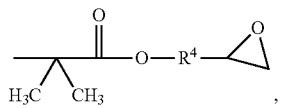

where $R^4$ is a $C_1$-$C_6$ alkylene.

13. The crosslinkable composition of claim 1 wherein the epoxy-functional (meth)acryloyl monomer is of the formula:

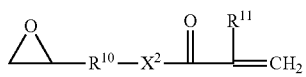

wherein:
$R^{10}$ is a (hetero)hydrocarbyl group;
$R^{11}$ is —H or —H or $C_1$-$C_4$ alkyl;
$X^2$ is —$NR^{12}$— or —O—; and
$R^{12}$ is —H or a $C_1$-$C_4$ alkyl.

14. A crosslinkable composition of claim 1 comprising:
a) an epoxy-functional (meth)acrylic copolymer that comprises interpolymerized monomers comprising:
 i) 85 to 99 parts by weight of a (meth)acrylic acid ester monomer;
 ii) 1 to 20 parts by weight of an epoxy-functional (meth)acryloyl monomer;
 iii) 1 to 15 parts by weight of an acid-functional ethylenically unsaturated monomer;
 iv) 0 to 10 parts by weight of a non-acid-functional polar monomer;
 v) 0 to 5 parts by weight of a vinyl monomer;
 vi) 0 to 5 parts of a multifunctional (meth)acrylate crosslinker; and
b) 0.01 to 1 parts by weight of an ionic photoacid generator based on 100 parts by weight total monomer i) to v)).

15. The crosslinkable composition of claim 14 further comprising a tackifier.

16. The crosslinkable composition of claim 1 wherein the epoxy-functional (meth)acryloyl monomer is of the formula:

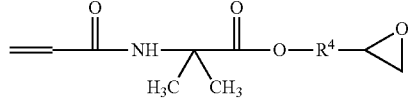

where $R^4$ is $C_1$-$C_4$ alkylene.

17. A crosslinkable syrup composition comprising:
the solute (meth)acryloyl copolymer of claim 1 comprising a plurality of interpolymerized monomers comprising pendant epoxy units;
a component comprising at least one free-radically polymerizable solvent monomer; and
an ionic photoacid generator.

18. The crosslinkable syrup composition of claim 17 where the solute (meth)acryloyl copolymer comprises:
 i) 85 to 99 parts by weight of a (meth)acrylic acid ester monomer;
 ii) 1 to 20 parts by weight of an epoxy-functional (meth)acryloyl monomer;
 iii) 1 to 15 parts by weight of an acid-functional ethylenically unsaturated monomer;
 iv) 0 to 10 parts by weight of a non-acid-functional polar monomer;
 v) 0 to 5 parts by weight of a vinyl monomer;
based on 100 parts by weight total monomer.

19. The crosslinkable syrup composition of claim 17 where the solvent monomer comprises:
(meth)acrylic acid ester monomer;
epoxy-functional (meth)acryloyl monomer;
optional acid-functional ethylenically unsaturated monomer;
optional non-acid-functional polar monomer;
optional vinyl monomer;
optional multifunctional (meth)acrylate crosslinker.

20. The crosslinkable syrup composition of claim 17 wherein the interpolymerized monomers comprise an epoxy-functional (meth)acryloyl monomer is of the formula:

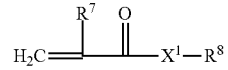

wherein:
$R^7$ is —H or $C_1$-$C_4$ alkyl;
$X^1$ is —O— or —NR—;
$R^8$ is an epoxy-substituted hydrocarbyl group; and
$R^9$ is —H or a $C_1$-$C_4$ alkyl.

21. The crosslinkable syrup composition of claim 17 wherein the interpolymerized monomers comprise an epoxy-functional (meth)acryloyl monomer of the formula:

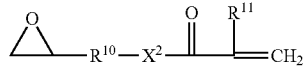

wherein:
$R^{10}$ is a (hetero)hydrocarbyl group (preferably, hydrocarbyl);
$R^{11}$ is —H or $C_1$-$C_4$ alkyl;
$X^2$ is —$NR^{12}$— or —O—; and
$R^{12}$ is —H or a $C_1$-$C_4$ alkyl.

22. The crosslinkable syrup composition of claim 17 wherein the ionic photoacid generator is selected from iodonium salts; sulfonium salts, selenonium salts sulfoxonium salts, phosphonium salts and arsonium salts.

23. The crosslinkable syrup composition of claim 17 wherein the ionic photoacid generator is used in an amount of 0.01 to 1 part by weight, relative to 100 parts by weight of solute copolymer and solvent monomer(s).

24. A pressure-sensitive adhesive composition prepared from a crosslinkable composition of the crosslinkable syrup composition of claim 17.

25. A pressure-sensitive adhesive article comprising a coating of the adhesive of claim 24 on a backing.

26. A method of preparing a pressure-sensitive adhesive comprising the steps of
   a) providing a syrup copolymer composition comprising solvent monomer(s) and a solute copolymer of interpolymerized monomer units of:
      i) an alkyl (meth)acrylate monomer;
      ii) an epoxy-functional (meth)acryloyl monomer;
      iii) an acid-functional ethylenically unsaturated monomer in amounts of 1 to 15 parts by weight of the 100 parts of the total monomer;
      iv) an optional non-acid functional polar monomer;
      v) an optional vinyl monomer; and
   b) combining the syrup copolymer composition with an ionic photoacid generator, optional multifunctional (meth)acrylate and optional photoinitiator, and
   c) irradiating with UV radiation.

\* \* \* \* \*

UNITED STATES PATENT AND TRADEMARK OFFICE
CERTIFICATE OF CORRECTION

PATENT NO.         : 8,785,517 B2
APPLICATION NO.    : 13/155935
DATED              : July 22, 2014
INVENTOR(S)        : Weikel et al.

It is certified that error appears in the above-identified patent and that said Letters Patent is hereby corrected as shown below:

On the Title Page,
Item [54] and in the Specification, Column 1, Line 2, in the title, delete "EPDXY" and insert -- EPOXY --, therefor.

In the Specification,
Column 5,
Line 18, delete "WA VITA" and insert -- IVA VIIA --, therefor.
Line 54, delete "normucleophilic" and insert -- nonnucleophilic --, therefor.

Column 6,
Line 18, before "Rhodorsil" insert -- s --.

Column 21-22,
Line 31, delete "cstands" and insert -- c stands --, therefor.
Line 50, delete "cstands" and insert -- c stands --, therefor.

Column 23-24,
Line 12, delete "cstands" and insert -- c stands --, therefor.
Line 28, delete "cstands" and insert -- c stands --, therefor.
Line 46, delete "cstands" and insert -- c stands --, therefor.

In the Claims,
Column 29,
Line 49, Claim 14, delete "10parts" and insert -- 10 parts --, therefor.
Line 55, Claim 14, delete "yl)." and insert -- vi). --, therefor.

Column 30,
Line 42, Claim 20, delete "—NR—;" and insert -- —NR$^9$—; --, therefor.

Signed and Sealed this
Fourth Day of November, 2014

Michelle K. Lee
*Deputy Director of the United States Patent and Trademark Office*